United States Patent [19]

Schwitters, Wayne J.

[11] Patent Number: 4,691,506
[45] Date of Patent: * Sep. 8, 1987

[54] APPARATUS FOR DEFOLIATING SUGAR BEETS AND THE LIKE UTILIZING FLEXIBLE FLAILS WITH RIGID CUTTING MEMBERS AT THE FREE ENDS THEREOF

[75] Inventor: Schwitters, Wayne J., Clara City, Minn.

[73] Assignee: WIC, Inc., Shelly, Minn.

[*] Notice: The portion of the term of this patent subsequent to Sep. 8, 2004 has been disclaimed.

[21] Appl. No.: 745,191

[22] Filed: Jun. 17, 1985

[51] Int. Cl.$^4$ .............................................. A01D 23/02
[52] U.S. Cl. ................... 56/121.4; 56/121.43; 56/12.7; 56/504
[58] Field of Search ............. 56/121.4, 121.41, 121.42, 56/121.43, 121.44, 121.45, 121.46, 501, 502, 504, 505, 12.7

[56] References Cited

U.S. PATENT DOCUMENTS

| 2,597,485 | 5/1952 | Hillger | 56/12.7 |
| 2,608,816 | 9/1952 | Lembke | 56/121.4 |
| 2,668,407 | 2/1954 | Sherman | 56/12.7 |

FOREIGN PATENT DOCUMENTS

| 160385 | 5/1955 | Australia | 56/12.7 |
| 1102510 | 7/1984 | U.S.S.R. | 56/121.4 |

Primary Examiner—Gene Mancene
Assistant Examiner—John G. Weiss
Attorney, Agent, or Firm—Peterson, Wicks, Nemer & Kamrath

[57] ABSTRACT

A defoliator for detopping sugar beets and the like includes at least one laterally extending rotor on which a plurality of flails are mounted. The flails are of polyurethane and have a hub at one end provided with a bore so that they can be pivotally attached to a rod supported on the rotor. Each group of flails includes tapered flails at the ends of the group and rectangularly configured flails therebetween with still an additional tapered flail between the two non-tapered flails. Each flail has a rigid cutting member at the free end thereof, each cutting member being channel-shaped so as to provide parallel flanges projecting in one direction with respect to an integral web having a hole therein so that the member can be bolted to the free end of the flail with which it is to be associated. Each cutting member has an additional flange extending in an opposite direction from the parallel flanges, the additional flange residing in a proximal relation with one side of the flail. The rigid cutting members, as the flails are rotated, scrape along the unlifted beets so as to effectively cut and remove the leaves therefrom. The polyurethane flails, being flexible, are free to be deflected as their rigid cutting members are dragged across the surfaces of the beets.

20 Claims, 6 Drawing Figures

APPARATUS FOR DEFOLIATING SUGAR BEETS AND THE LIKE UTILIZING FLEXIBLE FLAILS WITH RIGID CUTTING MEMBERS AT THE FREE ENDS THEREOF

BACKGROUND OF THE INVENTION

1. Field of the Invention

This invention relates generally to defoliating apparatus for removing leaves from sugar beets and the like while the beets are still in the ground, and pertains more specifically to apparatus employing a plurality of flexible flails, each having at least one rigid cutting member at the free end thereof.

2. Description of the Prior Art

It is recognized that it is virtually mandatory to remove all of the leaves from sugar beets prior to lifting them from the ground. If the foliage is not removed, the leaves, when the beets are stored in piles, will continue to grow, causing loss of sugar content and undue spoilage; this is especially so when heat, moisture and/or wet soil are present.

Inasmuch as the problem has been in the past recognized, solid steel flails have been employed, the flails being pivotally mounted to a rotating drum. The height of the drum would be adjusted so that the steel flails would cut down the greens without cutting into those beets of normal height. However, in order to completely clean the remaining leaves not removed by the steel flails, two additional drums comprised of rubber flails have been used in combination with the steel flails, the rubber flails rotating in opposite directions with respect to each other. The salient shortcoming with such a prior art system has been that the beets themselves where they had grown abnormally high would be cut off at the level at which the machine is set and thus lost in that the portion thereof projecting above the ground to any degree would be completely severed. If not severed by the steel flails, those beets that have grown out of the ground to an appreciable degree would then be broken off by the trailing scalpers that have been required to clean those beets having foliage not fully removed by the tandemly oriented flails. The scalpers, it can be pointed out, would at times roll some of the beets completely out of the ground, and attributable to the fact that the scalper knives would become dull due to the fact that they would be dragged through the soil, breaking the backsides of an objectionable number of beets, removing portions from the ground, and leaving portions in the ground.

Due to the troubles experienced from the combined use of both solid steel flails and flexible flails, as mentioned above, it has been commonplace to utilize an all rubber flail defoliator. Such defoliators include three drums with scalpers pulled therebehind. When using such an arrangement, the beets are no longer cut down to the extent that they would be when using steel flails plus trailing scalper blades. Whereas several tons of beets can be saved per acre when using all rubber flails, nonetheless, in some situations the beets would not be cleaned as well as they should be in order to avoid damage to the beets when piled for storage.

Furthermore, even before the beets are lifted from the ground, during cold harvesting periods, the leaves can freeze so that they cannot be effectively removed, even when going to the trouble and expense of retopping the leaves. Consequently, when beets with leaves remaining thereon enter the lifter of the harvester, plugging results. In other words, the beets, when still having leaves thereon, simply will not pass through the harvesting machine.

Still further, people have been injured trying to clean the lifters when clogged, so sugar beet farmers have been compelled to set the scalpers quite deep in an attempt to obviate the plugging difficulties. However, this results in many tons of beets being unnecessarily cut and the processable amount that can be salvaged reduced appreciably.

Hence, there has been a constant effort to derive both a better product and a greater amount of such product. Any improvement helps the farmer get more beets per acre and also enables him to deliver a better product to the sugar mill.

Because steel flails have caused so much trouble in the past, they have become virtually obsolete. However, the use of rubber flails is quite widespread and an example of defoliating apparatus making use of such flails is illustrated in U.S. Pat. No. 4,291,524, granted Sept. 29, 1981 to Donald C. Gates. Even though the apparatus described in the alluded to patent makes an effort to reduce the difficulties stemming from the use of flexible flails, doing so by means of a plurality of flexible fingers or projections integral with the rubber flail. Nonetheless, the problem of completely, or even substantially doing so, removing leaves from beets before they are lifted from the ground is not fully solved.

SUMMARY OF THE INVENTION

An important object of my invention is provide a defoliator for sugar beets and the like that will provide a more complete removal of the leaves from the beets while still in the ground, doing so more effectively than just rubber flails per se, and also avoiding the loss and damage to sugar beets resulting from the previously used combination of steel flails and flexible flails. Stated somewhat differently, an aim of my invention is to provide apparatus for defoliating sugar beets and the like which will simulate the action of steel flails without the attendant disadvantages thereof and which apparatus will perform better than commonly used flexible flails.

Another object of the invention, although not achievable in every instance, is to obviate the need for scalpers, together with the time-consuming task of having to sharpen the blades thereof.

The invention also has for an object the elmination, in most instances, of one of the conventionally employed three rotors on which the flails are pivotally mounted, the reduction to two rotors effecting a substantial monetary saving which is possible when practicing my invention.

Another object of the invention is to impart sufficient rigidity to the free ends of flexible flails so that they literally peel the leaves from sugar beets before the beets are removed from the soil in which they have grown, thereby avoiding the foliage problems that have plagued sugar beet farmers for many years. In this regard, an aim of my invention is to provide a rigid cutting or scraping member at the free end or tip of each flexible flail where it will be most efficient as far as severing the beet leaves.

Another object of the invention is to provide a means for improving the action of flexible flails at little expense to the farmer. More specifically, it is within the purview of my invention to enable the flails to be equipped with my invention at the time the flails are manufactured or to be added to flexible flails already sold and in use. More specifically, an aim of the invention is to provide a steel member constituting a cutting or scraping element that can be readily attached to the free end of a flexible flail. In this regard, it is specifically contemplated that a metal cleat having flanges with teeth formed thereon be bolted to the free end of a flexible flail so that the cleat in combination with other such cleats will effectively remove virtually all of the greens from sugar beets while still in the ground.

Another object of the invention is to provide a means for removing foliage from yet to be lifted sugar beets that can be readily replaced when circumstances so require. In this regard, it is specifically planned that the cutting means, in the form of a cleat, be of steel, preferably case-hardened or of a suitable alloy to minimize wear when cutting or scraping off the foliage from the beets. Yet, the preserved flexibility of the flail enables the flail to be deflected by a sugar beet to one side or the other, or to bow while scraping the top of the beet, doing so to such an extent that the foliage is for all intents and purposes completely removed.

Another object of my invention, which is very important, is to utilize a polyurethane flexible flail, the polyurethane having exceptional resistance to abrasion, to being cut or to being torn. Also, such material serves as a good anchoring medium for the cutting member intended to achieve the leaf removal. The employment of polyurethane in combination with a metal cutting member permits greater rotative speeds of the drum to be employed, if desired.

Another object is to provide a cutting member, specifically a cleat having flanges and sawteeth thereon, that can be attached to different width flails. In this regard, tapered flails usually have a one inch width at their free end or tip, whereas non-tapered flails usually have a two inch width. When practicing my invention, one cleat can be attached to each tapered flail and two such cleats attached to each wider, non-tapered flail.

Briefly, my invention contemplates the use of flexible flails, each having a rigid cutting or scraping member at the free end or tip thereof that will effectively cut off and remove leaves from sugar beets and the like while the beets are still in the field. In this respect, the invention possesses the advantages of both steel and flexible flails, the invention offering a decided improvement over either of these two flail types when considered individually or collectively. The rigid cutting member, when in the form of a cleat for scraping or scrubbing off the leaves, comprises a web or plate portion and several flange portions, each of two of the flange portions having sawteeth thereon and the third flange portion being engageable with one side of the flexible flail to which the cleat is attached. Where a relatively narrow flail is to be equipped with a cleat falling within the scope of my invention, a single cleat is bolted on the flail adjacent the free end thereof, whereas two such cleats are attached to a wider flail. It is planned that the cutting members, when configured as cleats, not only be easily attached at the outset, but that they be equally easily replaced when worn.

DESCRIPTION OF THE PREFERRED EMBODIMENT

Figure 1:
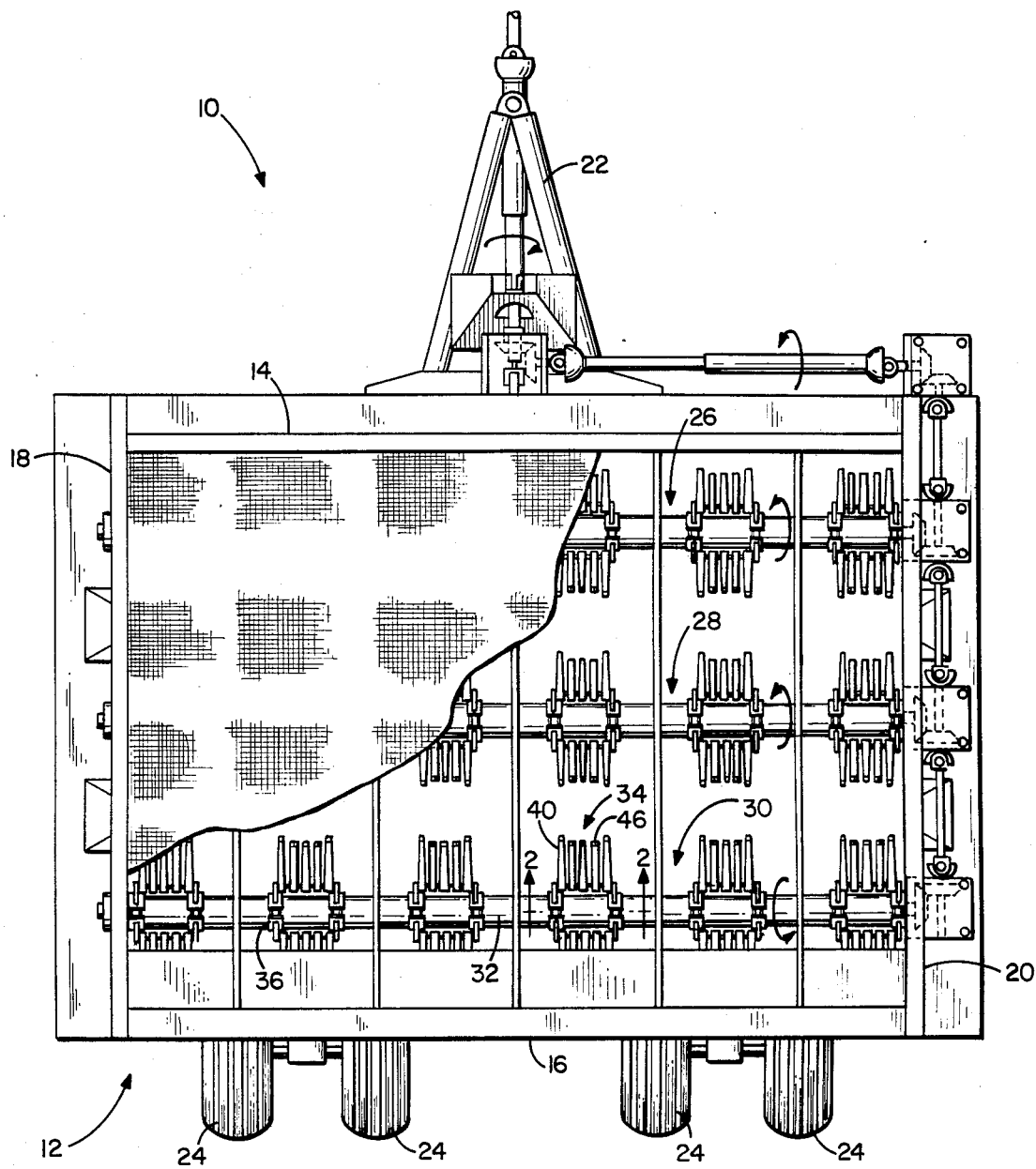
FIG. 1 is a top plan view of defoliating apparatus utilizing my invention.

Apparatus utilizing my invention has been indicated generally by the reference numeral 10. The apparatus 10 comprises a box frame 12 composed of a front transverse plate member 14, a rear transverse plate 16 and parallel side plate members 18 and 20. Projecting forwardly from the front plate member 14 is a hitch mechanism 22 via which the apparatus 10 can be pulled or towed by a tractor (not illustrated) across the field having the sugar beets growing therein and which sugar beets are to have their foliage or tops removed. At the rear are two pairs of wheels 24, the wheels 24 of each pair being laterally spaced so that each wheel 24 runs in the space between two adjacent rows of sugar beets.

Figure 2:
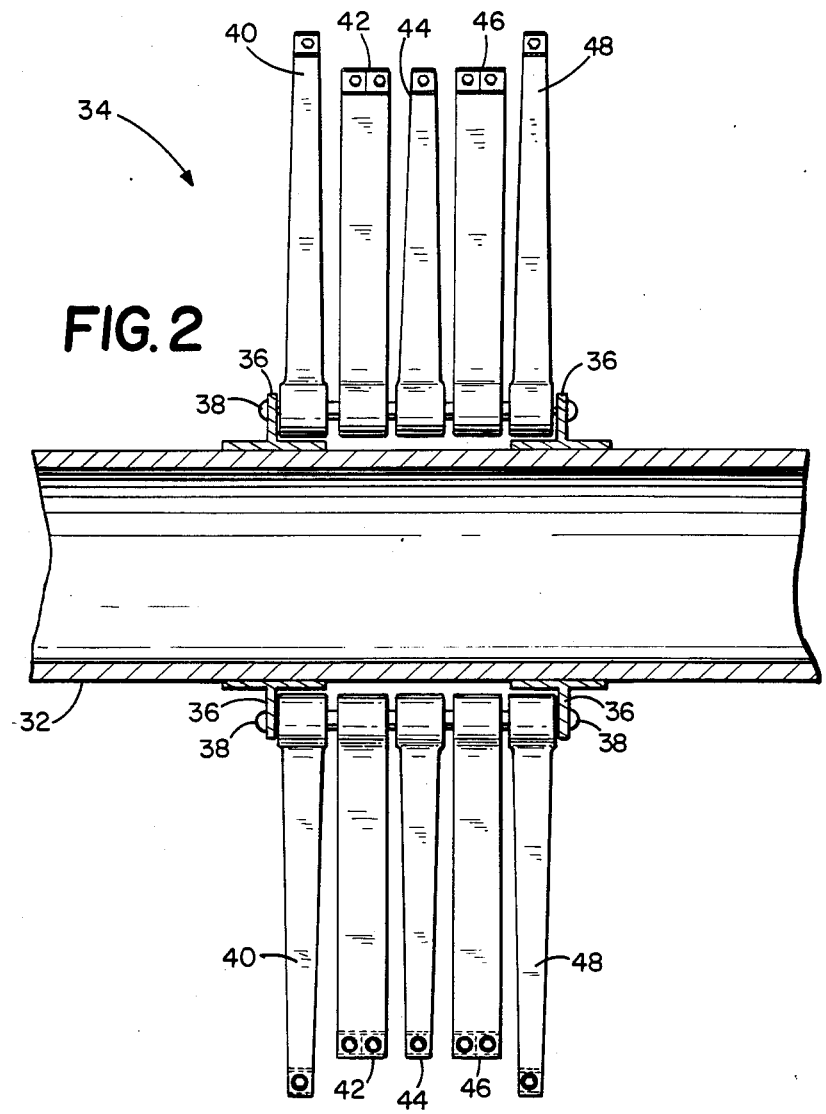
FIG. 2 is an enlarged elevational view of one of the groups of flails shown in FIG. 1, the view being taken in the direction of line 2—2 of this figure.
Figure 5:
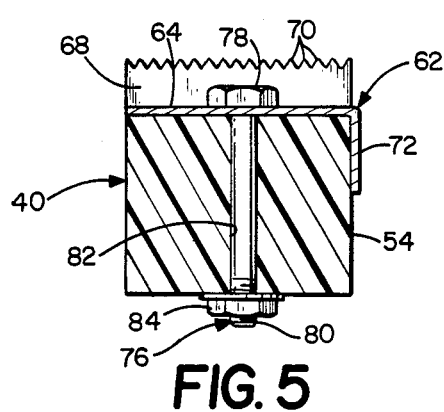
FIG. 5 is a sectional view taken in the direction of line 5—5 of FIG. 3 for the purpose of better depicting how the cleat is attached to the flails.
Figure 6:
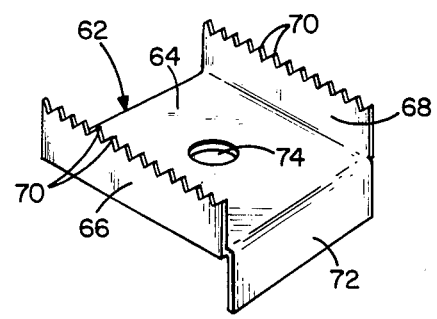
FIG. 6 is a perspective view of one of my cleats before being attached to a flail.

In order to progressively remove the tops or foliage from the sugar beets, three tandemly oriented rotors 26, 28 and 30 have been illustrated. Although three rotors 26, 28 and 30 have been depicted, it has already been explained that my invention affords the possibility of eliminating one such rotor, permitting only two to be employed in a number of instances. The need for scalpers, however, is for all intents and purposes obviated. These rotors 26, 28 and 30 are of the same general design. From FIG. 2 it will be discerned that the rotor 30 includes a cylindrical drum 32, the ends of the cylindrical drum 32 being journaled for rotation in the side plate members 18 and 20. It should be pointed out that the rotors 26, 28 and 30, each including a cylindrical drum 32, are frequently referred to as "drums".

From FIG. 1, it will be seen that each rotor 26, 28 and 30 has six individual groups of flails or units labeled 34 mounted thereon. From FIG. 2 it will be perceived that the flail group or unit 34 thereappearing includes semicircular plates 36, there being two such plates 36 at each end of the flail group or unit 34. The semicircular plates 36 are conventionally clamped to the cylindrical drum 32 by means of clamping bolts. Each semicircular plate 36 has a plurality of rods 38 extending therebetween, the ends of the rods 38 being fixedly anchored to the semicircular plates 36.

Figures 3, 4:
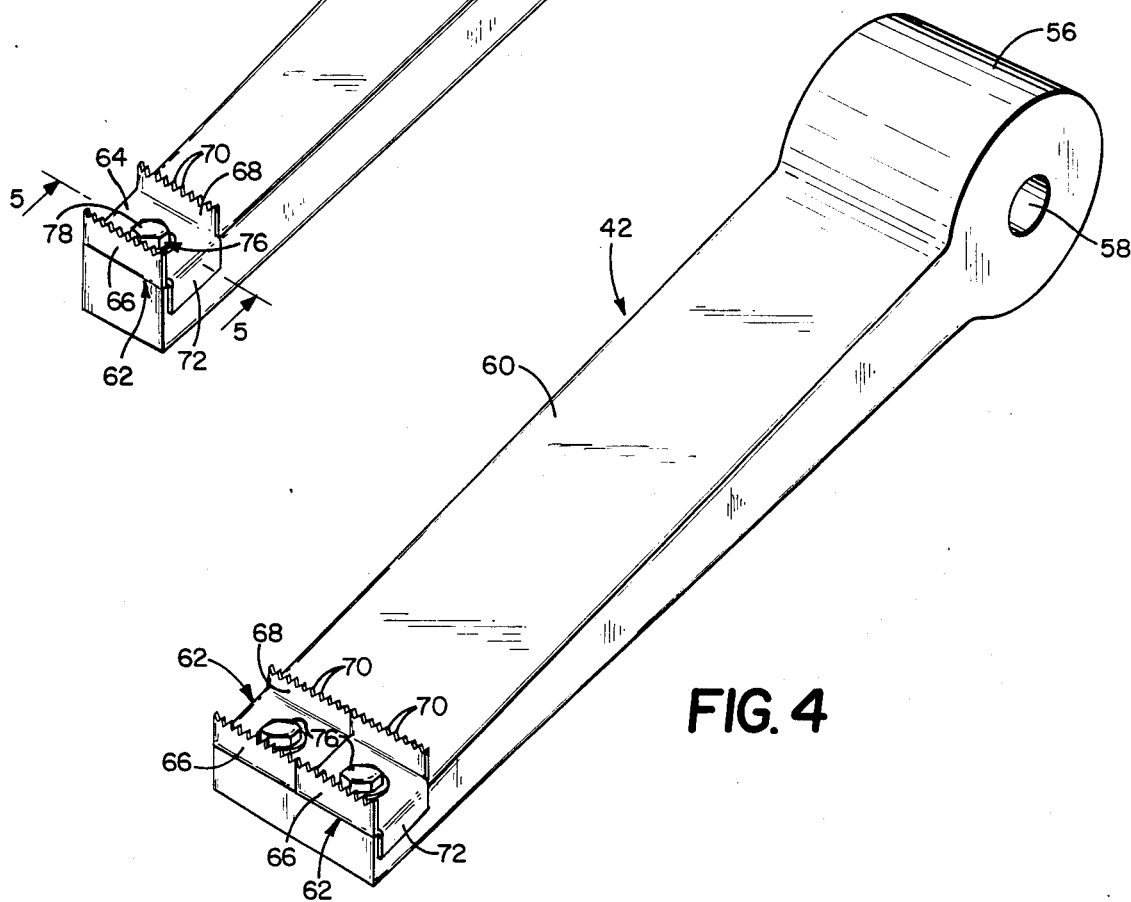
FIG. 3 is a perspective view of one of the tapered flails appearing in FIG. 2 with a single cleat attached thereto.
FIG. 4 is a perspective view of one of the non-tapered flails appearing in FIG. 2 with a pair of cleats attached thereto.

Pivotally carried on each of the various rods 38 are five individual flails labeled 40, 42, 44, 46 and 48. The flails 40–48 are all of flexible polyurethane, having a density in the range of from 1.0 to 6.0 pounds per cubic foot. As can be understood from FIG. 2, the flails 40, 44 and 48 are tapered, whereas the flails 42 and 46 are untapered. Still further, the tapered flails 40 and 48 are somewhat longer than the tapered flail 44. The tapered flail 44, however, is of the same length as the flails 42 and 46. More specifically, the free end or tip of the tapered flails 40, 44 and 48 are on the order of one inch, whereas the free end or tip of the nontapered flails 42 and 46 are on the order of two inches. Although the tapered flail 46 is better shown in FIG. 3, it will be appreciated that the flail 48 is a replica thereof and that the configuration of the tapered flail 44 is substantially the same; it is just that the flails 40 and 48 are one inch longer than the flail 44.

With reference to the flail 40, it will be perceived that the flail 40, as do the flails 44 and 48, possesses a hub or sleeve 50 having a bore 52 extending therethrough, the bore 52 receiving therein a portion of the rod 38 that provides the pivotal mounting therefor. The flail 40 has a shank 54 that tapers from approximately one and one-half inches adjacent the hub 50 to one inch at its free end or tip, thereby enabling it to be more readily deflected to one side of the beets being detopped. The shank 54, as illustrated, is of uniform thickness throughout its length, namely, a thickness of 0.75 inch. However, inasmuch as polyurethane is contemplated, which is somewhat harder than rubber, the half at the shank never the hub 50 can be made thinner than the other half where flexibility comparable to rubber is desired. Once again, the flail 48 is identical to the flail 40, and the flail 44 corresponds in configuration to the flails 40 and 48 with the exception that it is one inch shorter.

On the other hand, the flail 42, as does its twin 46, includes a hub or sleeve 56 having a bore 58, having a length of 12 inches instead of 13 inches extending therethrough which receives therein a portion of the rod 38 so that it is also pivotally mounted. The flail 42 has a shank 60 that is of uniform width throughout its length, namely, on the order of two inches. However, the thickness of the shank 60 in this instance tapers from 0.75 inch to a thickness approximating 0.375 inch at its free end or tip. Whereas, the flails 40, 44 and 48 are more flexible in a lateral direction, that is, toward either of the side plate members 18 or 20, the flails 42 and 46 are rendered more flexible in the direction the apparatus 10 is moving so as to bow and wipe over the still planted beets. The two flails 42 and 46, which are of uniform width, namely, two inches, throughout their length have an overall length of 12 inches, the same as the flail 44. The flails 42 and 46 produce a wind action, the effect of which assists in blowing the severed leaves to one side. Only tapered flails, however, are employed on the rotors 26 and 28.

In order to realize the benefits of my invention, the free ends or tips of the various flails 40-48 are provided with a number of rigid cutting members in the form of steel cleats 62, each having a generally channel-shaped configuration in that there is a web or plate portion 64 formed with a pair of parallel flanges 66, 68 extending substantially perpendicularly thereto. The flanges 66, 68, have a series of sawteeth 70 extending along their edges. Actually, the flanges 66 and 68, including their teeth 70, project approximately 0.25 inch from the plane of the web or plate portion 64. There is an additional or third flange 72 that extends perpendicularly from one edge of the web or plate 64, doing so in an opposite direction from that in which the flanges 66, 68 project.

The web or plate 64 has a hole or aperture 74 formed therein. In this way, a bolt 76 having a head 78 and threaded shank 80 can be inserted through a hole 82 in the shank 54. A nut 84, when threadedly fastened onto the shank 80 of the flail 40, will securely hold the rigid cutting cleat 62 in place. It will appreciated that the flange 72 bears against one side of the shank 54 so as to prevent the cleat 62 from twisting irrespective of the amount of deflecting or twisting forces applied thereto as the cleat performs its cutting and scraping action when passing over a sugar beet to effectively remove or detach the leaves therefrom.

Insofar as the flails 42, 46 are concerned, having approximately twice the width of the flails 40, 44, 48, it is intended that two cutting cleats 62 be used. My invention lends itself readily to employing two such devices, for all that need be done is to provide two holes in the shank 60 rather than the single hole 82, as used in the shank 54. By orienting the two cleats 62 in an 180° or opposite relationship with respect to each other, each flange 72 can bear against one side of the shank 60. In this way, both cleats 62 are prevented from twisting.

Insofar as the material from which the cutting members 62 are to be fabricated is steel, as has already been mentioned. It can now be explained that carbon or alloy steel should be utilized, preferably in the form of plate stock on the order of 1/16 inch thick. After being stamped and bent into the configuration shown, depending on its natural hardness, a heat treating step can be applied in order to case-harden the resulting member. It will be appreciated that the harder and more abrasive-resisting the resulting cleat 62 is, the less frequent it will require replacement due to wear.

While the cutting member in the form of the cleat 62 should be capable of withstanding the abrasive action of the soil, and that of other debris, as they pass thereover, and at times therethrough, it is also important to utilize an elastomer that will withstand abrasion and not resist tearing, yet be sufficiently flexible so as to be deflected over the curved surfaces of the upper ends of the beets. Possessing admirable properties in this regard is polyurethane and it is planned that the flails 40-48 be fabricated from this type of material. It will be appreciated that the hole 82 can be formed at the time the flails 40, 44, 48 are molded, or the hole can be drilled at any later time, including the forming of the hole in the field or after the flail has been sold to the farmer. The same thing holds true for the two holes employed in the wider flails 42, 46, for they can also be formed at the factory or later. By the same token, the cleat 62, while easily applied initially, can be equally easily replaced when necessary to do so. In any event, the rigid cutting member 62 should be installed on the forwardly advancing side of the flail rather than the trailing side. In this way, the member 62 is forced against the flail instead of away from the flail.

Consequently, my invention enables sugar beets in particular to be effectively defoliated, sufficiently so that heretofore experienced problems with the storage and sugar mill processing thereof will not be adversely affected.

I claim:

1. Apparatus for defoliating sugar beets and the like comprising a frame including front, rear and side members, at least one rotor journaled for rotation between said side members, a plurality of flexible polyurethane flails, means for pivotally connecting said flails to said rotor adjacent one end thereof, and rigid means mounted on each of said flails adjacent the other end thereof.

2. Apparatus for defoliating sugar beets and the like in accordance with claim 1 in which said rigid means includes a transverse metal flange.

3. Apparatus for defoliating sugar beets and the like in accordance with claim 2 in which said rigid means includes a cleat member having a web portion, and respective bolt means extending through each of said web portions for securing each cleat member to its flail.

4. Apparatus for defoliating sugar beets and the like in accordance with claim 1 including respective means for removably attaching said rigid means to one side of each of said polyurethane flails.

5. Apparatus for defoliating sugar beets and the like in accordance with claim 4 in which said removably attaching means in each instance extends completely through the polyurethane flail adjacent said other end thereof.

6. Apparatus for defoliating sugar beets and the like comprising a frame including front, rear and side members, at least one rotor journaled for rotation between said side members, a plurality of flexible flails, means for pivotally connecting said flails to said rotor adjacent one end thereof, rigid metal means including a channel-shaped cleat member, and bolt means for securing each cleat member to its flail.

7. Apparatus for defoliating sugar beets and the like in accordance with claim 6 in which each cleat member includes a pair of spaced flanges extending generally parallel to the free end of the flail with which it is associated.

8. Apparatus for defoliating sugar beets and the like in accordance with claim 7 in which each of said flanges has a plurality of sawteeth extending therealong.

9. Apparatus for defoliating sugar beets and the like in accordance with claim 8 including an additional flange, said additional flange extending in an opposite direction from said pair of flanges and generally perpendicularly thereto.

10. Apparatus for defoliating sugar beets and the like in accordance with claim 9 in which one of said toothed flanges resides at the tip of said flail and the other of said pair of flanges is spaced from said first flange.

11. Apparatus for defoliating sugar beets and the like in accordance with claim 6 in which said channel-shaped member includes a generally flat web, said flat web having a hole therein, said flails each having a hole, and said respective bolt means extending through the holes in said webs and the holes in said flails.

12. A flexible flail for use with apparatus for defoliating sugar beets and the like comprising a hub having a bore extending therethrough, a resilient shank integral with said hub, a rigid generally channel-shaped cutting member having a pair of parallel flanges, and bolt means for attaching said cutting member to said shank.

13. Apparatus for defoliating sugar beets in accordance with claim 12 in which each flange has a series of sawteeth extending alone the free edge thereof.

14. Apparatus for defoliating sugar beets and the like in accordance with claim 13 in which said flanges extend across the full width of said shank.

15. Apparatus for defoliating sugar beets and the like in accordance with claim 13 in which said flanges extend approximately halfway across the width of said shank.

16. Apparatus for defoliating sugar beets and the like in accordance with claim 15 in which a second rigid cutting member has a pair of parallel flanges, said additional flanges extending approximately halfway across the width of said shank, said additional flanges being in alignment with said first-mentioned flanges.

17. Apparatus for defoliating sugar beets and the like in accordance with claim 16 in which each flange of said second member has a series of sawteeth extending along the free edge thereof.

18. Apparatus for defoliating, sugar beets and the like in accordance with claim 12 in which said channel-shaped member has a web, said web having a hole therein and a bolt passing through said hole and through the thickness of said shank.

19. Apparatus for defoliating sugar beets and the like in accordance with claim 16 in which each of said cutting members has an additional flange, said additional flanges extending in an opposite direction from said pair of flanges and residing in a proximal relation with the sides of said shank.

20. Apparatus for defoliating sugar beets and the like comprising a flexible flail of polyurethane including a hub having a bore extending therethrough and a resilient shank integral with said hub, a rigid cutting member having a flat web portion attached to the end of said shank opposite said hub, said cutting member and its said flat portion both being of steel.

* * * * *